2,995,494
PROCESS FOR PURIFYING RELAXIN

Heron Orlando Singher, Plainfield, and Emanuel Augustus Swart, Somerville, N.J., assignors to Ortho Pharmaceutical Corporation, a corporation of New Jersey
No Drawing. Filed Dec. 27, 1957, Ser. No. 705,471
6 Claims. (Cl. 167—74)

The present invention relates to relaxin, the hormone responsible for pelvic relaxation of the estrogen-primed guinea pig, and to a new method of purifying this hormone. This application is a continuation-in-part of our co-pending application Serial No. 647,495, filed March 21, 1957.

Relaxin has been used successfully to decrease the incidence of premature labor and the attendant fetal mortality. Because of its pharmacological effect, the isolation of relaxin in a pure state has recently assumed considerable importance.

The chemical structure of relaxin is not known. Indeed, prior to the invention described in our co-pending application Serial No. 647,495, filed March 21, 1957, no sample of relaxin had been obtained that approached chemical homogeneity. Because guinea pigs are customarily used to assay relaxin, the activity of this hormone is expressed in guinea pig units (G.P.U.). Manual palpation of castrated estrogen-primed guinea pigs six hours after injection of the material being tested is the technique employed for relaxin assay. This assay method is described by Abramowitz et al. in Endocrinology 34, page 103 (1944), and the term guinea pig units (G.P.U.) will be used to express hormone activity throughout the present specification and claims.

Relaxin has been found in the blood placenta and reproductive tract of a widely diversified group of mammals. The main source for its isolation in the crude state has heretofore been sow ovaries, from which it has been extracted by three percent hydrochloric acid. The relaxin content of the sow ovaries begins to increase in early pregnancy and will reach a concentration of 1,000 to 10,000 guinea pig units per gram.

An object of the present invention is to provide an improved method of purifying relaxin.

Still another object of this invention is the preparation of purified relaxin concentrate of high activity.

It has now been discovered that concentrates of relaxin may be purified by addition of acetone to form a precipitate. The precipitate is redissolved in water and methanol is added to the aqueous solution to reprecipitate the relaxin. Finally, ethyl ether is added to precipitate additional relaxin and the mixture is centrifuged. The solid residue is washed with ether and dried to obtain a powder having a relaxin activity of about 400,000 G.P.U. per milligram of nitrogen.

Relaxin, whether obtained from sow ovaries or from the urine of pregnant mammals, is usually isolated as an aqueous solution. In the present process of purification, these aqueous concentrates of crude relaxin are heated under vacuum until substantially all of the water is removed. This heating process is carried out at temperatures below about 55° C. (118 mm. Hg) to prevent, insofar as is possible, any decrease in the activity of the final product. Thus, if the pressure is reduced to about 25 mm. Hg, the water may be removed at about 25° C. with no loss of relaxin activity.

The residue, after substantially all of the water has been removed, is an oil or glass-like solid. To one part by volume of this residue is added with stirring about 4 parts by volume of acetone. An oil separates from the mixture and the suspension is centrifuged at 1750 r.p.m., for 20 minutes at about —10° C. The supernatant is discarded and the residue, a viscous brown oil, is dissolved in the minimum amount of distilled water required to give a clear solution at room temperature. To one part by volume of this aqueous solution is added about 7 to 8 parts by volume of methanol with constant mixing. This amount of methanol is sufficient to precipitate completely all the methanol-insoluble material that is present in the aqueous solution. The material may precipitate out of solution as an oil or as a solid. One part by volume of ether equivalent to 3 parts by volume of the aqueous concentrate that had been admixed with methanol is then added; more material is precipitated as an oil or a solid from this mixture. The mixture is centrifuged at 4300 r.p.m. for 20 minutes at —10° C. The supernatant is discarded. The residue is washed with ether and dried "in vacuo" over phosphoric anhydride. A solid powder is obtained in this fashion, and has a relaxin activity of 1,000,000 to 2,500,000 guinea pig units per gram.

For a better understanding of the invention, reference may be had to the following example.

Example I

In a typical example, 18,740 ml. of relaxin concentrate, prepared from pregnant bovine urine and assaying 1,000 G.P.U. per ml. (172,400 G.P.U. per mg. N), is concentrated "in vacuo" to about 1700 ml. and the concentrate is washed out of the concentrator into a volumetric flask with 200 cc. of water. Seventy-six hundred ml. of acetone is added to 1900 ml. of the aqueous concentrate to precipitate completely all aqueous acetone-insoluble material as an oil. After standing overnight at —5° C., the material is centrifuged. The supernatant is discarded. The oily residue is dissolved in 138 ml. of distilled water at about 50° C. to 60° C. Methanol is then added until precipitation is complete; a total volume of 1,000 ml. of methanol is used. Ether is then added to the aqueous methanol suspension until no further precipitation occurred on further addition; 500 ml. of ether is required. The suspensions are stored overnight at —20° C. and then centrifuged. The supernatant is discarded. The semi-solid residue is washed with ether and then dried "in vacuo" over phosphoric anhydride. A lavender-colored solid, weighing 32.5 grams, is obtained.

A sample at a concentration of 0.1 microgram per milliliter corresponds to 10,000 G.P.U. per milligram. Since one milligram of the solid contains 0.0247 milligram of nitrogen, the activity of the solid is 405,000 G.P.U. per milligram of nitrogen.

While the invention has been described in detail according to the preferred manner of carrying out the process and producing the products, it will be obvious to those skilled in the art, after understanding the invention, that changes and modifications may be made therein without departing from the spirit or scope of the invention and it is intended in the appended claims to cover all such alterations and modification.

We claim:
1. A process for purifying relaxin which comprises suspending crude relaxin substantially free of water in acetone; centrifuging the suspension and discarding the supernatant liquid; dissolving the residue in a minimum amount of water; adding methanol until no more relaxin is precipitated; adding ether to precipitate additional relaxin and isolating the combined relaxin precipitates.
2. A process for purifying relaxin which comprises suspending crude relaxin substantially free of water in about four parts by volume of acetone; centrifuging the suspension and discarding the supernatant liquid; dissolving the residue in a minimum amount of water to form an aqueous solution; adding about seven to eight parts by volume of methanol to this aqueous solution to precipitate relaxin; adding a volume of ether equal to about one-half the volume of methanol added to precipitate additional relaxin; and isolating the combined relaxin precipitates.

3. A process for purifying relaxin which comprises suspending crude relaxin substantially free of water in acetone; centrifuging the suspension and discarding the supernatant liquid; dissolving the residue in a minimum amount of water at about 50° C. to 60° C.; adding methanol until no more relaxin is precipitated; adding ether to precipitate additional relaxin and isolating the combined relaxin precipitates.

4. A process for purifying relaxin which comprises suspending crude relaxin substantially free of water in about four parts by volume of acetone; centrifuging the suspension and discarding the supernatant liquid; dissolving the residue in a minimum amount of water at about 50° C. to 60° C. to form an aqueous solution; adding about seven to eight parts by volume of methanol to this aqueous solution to precipitate relaxin; adding a volume of ether equal to about one-half the volume of methanol added to precipitate additional relaxin; and isolating the combined relaxin precipitates.

5. A process for purifying an aqueous concentrate of relaxin which comprises heating the relaxin in vacuum at temperatures below about 55° C., until substantially all of the water is removed; suspending the crude relaxin residue in acetone; centrifuging the suspension and discarding the supernatant liquid; dissolving the residue in a minimum amount of water at about 50° C. to 60° C.; adding methanol until no more relaxin is precipitated; adding ether to precipitate additional relaxin and isolating the combined relaxin precipitates.

6. A process for purifying an aqueous concentrate of relaxin which comprises heating the concentrate in vacuum at temperatures below about 55° C., until substantially all of the water is removed; suspending the crude relaxin residue in about four parts by volume of acetone; centrifuging the suspension and discarding the supernatant liquid; dissolving the residue in a minimum amount of water at about 50° C. to 60° C., to form an aqueous solution; adding about seven to eight parts by volume of methanol to this aqueous solution to precipitate relaxin; adding a volume of ether equal to about one-half the volume of methanol added to precipitate additional relaxin; and isolating the combined relaxin precipitates.

References Cited in the file of this patent

UNITED STATES PATENTS

| | | |
|---|---|---|
| 2,852,431 | Kroc | Sept. 16, 1958 |
| 2,852,432 | Phillips | Sept. 16, 1958 |

FOREIGN PATENTS

| | | |
|---|---|---|
| 161,682 | Australia | Mar. 4, 1955 |

OTHER REFERENCES

Hisaw: Vitamins and Hormones, vol. 8, 1950, page 163, Academic Press, New York, N.Y.